United States Patent
Sasaki (10) Patent No.: US 9,322,473 B2
(45) Date of Patent: Apr. 26, 2016

(54) METHOD OF PRODUCING PISTON OF INTERNAL COMBUSTION ENGINE

(71) Applicant: Hitachi Automotive Systems, Ltd., Hitachinaka-shi, Ibaraki (JP)

(72) Inventor: Masato Sasaki, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 604 days.

(21) Appl. No.: 13/753,058

(22) Filed: Jan. 29, 2013

(65) Prior Publication Data

US 2013/0205991 A1 Aug. 15, 2013

(30) Foreign Application Priority Data

Feb. 15, 2012 (JP) ................................. 2012-030032

(51) Int. Cl.
| | |
|---|---|
| *F16J 1/04* | (2006.01) |
| *F16J 1/08* | (2006.01) |
| *B23P 15/10* | (2006.01) |
| *F02F 3/10* | (2006.01) |
| *F02F 3/00* | (2006.01) |

(52) U.S. Cl.
CPC .. *F16J 1/08* (2013.01); *B23P 15/10* (2013.01); *F02F 3/105* (2013.01); *F02F 3/00* (2013.01); *F05C 2225/06* (2013.01); *F05C 2225/10* (2013.01); *F05C 2251/14* (2013.01); *F05C 2253/12* (2013.01); *Y10T 29/49263* (2015.01)

(58) Field of Classification Search
CPC ................... F16J 1/01; F16J 1/02; F16J 1/08; F02F 3/105
USPC ................................. 92/155, 223; 29/888.048
See application file for complete search history.

(56) References Cited

U.S. PATENT DOCUMENTS

| | | | | |
|---|---|---|---|---|
| 8,220,433 B2 * | 7/2012 | Sasaki | ........................ | F16J 1/08 92/223 |
| 8,667,945 B2 * | 3/2014 | Sasaki | ....................... | F02F 3/10 92/223 |
| 8,789,509 B2 | 7/2014 | Sasaki | | |
| 2010/0236516 A1 | 9/2010 | Sasaki | | |

FOREIGN PATENT DOCUMENTS

| | | |
|---|---|---|
| JP | 2010-216362 A | 9/2010 |
| WO | WO 02/099019 A1 | 12/2002 |

OTHER PUBLICATIONS

Japanese Office Action dated May 26, 2015 (three (3) pages).

* cited by examiner

*Primary Examiner* — Michael Leslie
(74) *Attorney, Agent, or Firm* — Crowell & Moring LLP

(57) ABSTRACT

A method of producing a piston includes a step of producing a naked piston having the skirt portion; a step of forming the skirt portion with streaks; a step of applying a skirt portion of the naked piston with a first film forming paint which is provided for producing the inner solid lubricant film; a step of heating the first film forming paint on the skirt portion at a temperature of 60° C. to 160° C. for a time less than 800 seconds to dry the same; a step of applying an outer surface of the dried first film forming paint with a second film forming paint which is provided for producing the outer solid lubricant film; and a step of heating the first and second film forming paints on the skirt portion at a temperature of 160° C. to 240° C. for a time of 15 minutes to 180 minutes.

9 Claims, 9 Drawing Sheets

S1 ··· MACHINING
S2 ··· CLEANING
S3 ··· 1'ST PAINT BY SPRAY
S4 ··· DRYING
S5 ··· 2'nd PAINT BY SCREEN PRINTING
S6 ··· FULL FIRING

S1 ··· MACHINING
S2 ··· CLEANING
S3' ··· 1'ST PAINT BY SCREEN PRINTING
S4 ··· DRYING
S5 ··· 2'nd PAINT BY SCREEN PRINTING
S6 ··· FULL FIRING

METHOD OF PRODUCING PISTON OF INTERNAL COMBUSTION ENGINE

BACKGROUND OF THE INVENTION

1. Field of the Invention

The present invention relates in general to methods of producing a piston of an internal combustion engine and more particularly to methods of applying an outer surface of a skirt portion of the piston with a double layer solid lubricant film.

2. Description of Related Art

One of the methods for applying the skirt portion of a piston with such double layer solid lubricant film is shown in Japanese Laid-open Patent Application (tokkai) 2010-216362.

In the method, a machined or naked piston is subjected to a water washing to be cleaned and then the cleaned piston is dried. Then, a composition for an inner layer film, which shows a less wearing property, is applied through a screen printing to an outer surface of a skirt portion of the naked piston and fired in a certain condition to form a first solid lubricant film (viz., the inner layer film). Then, the piston having the first solid lubricant film just fired is cooled and a composition for an outer layer film, which shows a higher wearing property, is applied through a screen printing to the outer surface of the first solid lubricant film and fired in a certain condition to form a second solid lubricant film (viz., the outer layer film) on the first solid lubricant film. With this processing, a double layer solid lubricant film is produced on the outer surface of the skirt portion of the piston.

With the above-mentioned method, streaks left on the outer surface of the skirt portion of the piston are effectively covered by the double layer solid lubricant film. Under operation of the piston thus produced in a corresponding engine cylinder, the second solid lubricant film is worn relatively early due to its higher wearing property and the first solid lubricant film, which has the less wearing property, is then exposed to the outside and slowly worn but smoothly. With such smoothed outer surface, the piston can exhibit a very low friction when operates in the engine cylinder.

SUMMARY OF THE INVENTION

However, in the above-mentioned method, two firing steps are needed for producing the double layer solid lubricant film on the skirt portion of the piston. Employment of the two firing steps causes a long time for producing the double layer solid lubricant film and thus for producing a finished piston.

In view of the above-mentioned drawback possessed by the conventional piston producing method, an object of the present invention is to provide a piston producing method that can shorten the time for producing a double layer solid lubricant film.

In accordance with a first aspect of the present invention, there is provided a method of producing a piston of an internal combustion engine, the piston having a skirt portion on which inner and outer solid lubricant films are formed as a double layer solid lubricant film, the outer solid lubricant film having a wear resistance lower than that of the inner solid lubricant film, the method comprising producing a naked piston having the skirt portion; forming the skirt portion with streaks; applying the skirt portion of the naked piston with a first film forming paint which is provided for producing the inner solid lubricant film; heating the first film forming paint on the skirt portion at a temperature of 60° C. to 160° C. for a time less than 800 seconds to dry the same; applying an outer surface of the dried first film forming paint with a second film forming paint which is provided for producing the outer solid lubricant film; and heating the first and second film forming paints on the skirt portion at a temperature of 160° C. to 240° C. for a time of 15 minutes to 180 minutes.

In accordance with a second aspect of the present invention, there is provided a method of producing a piston of an internal combustion engine, the piston having a double layer solid lubricant film formed on a skirt portion thereof, the method comprising producing a naked piston having the skirt portion; applying an outer surface of the skirt portion with a first film forming paint which is provided for producing an inner solid lubricant film; heating the first film forming paint at a first temperature to cause the first film forming paint to be damp-dried with some organic solvent left therein; applying an outer surface of the damp-dried first film forming paint with a second film forming paint which is provided for producing an outer solid lubricant film; and firing the first and second film forming paints at a second temperature that is higher than the first temperature.

In accordance with a third aspect of the present invention, there is provided a piston of an internal combustion engine, the piston comprising a naked piston having a skirt portion; streaks formed on an outer surface of the skirt portion; an inner solid lubricant film formed on the outer surface of the skirt portion while covering the streaks, the inner solid lubricant film being produced by heating a first film forming paint at a temperature of 60° C. to 160° C. for a time less than 800 seconds to dry the same; and an outer solid lubricant film formed on an outer surface of the inner solid lubricant film, the inner and outer solid lubricant films being produced by heating both the first film forming paint and a second film forming paint provided for the outer solid lubricant film at a temperature of 160° C. to 240° C. for a time of 15 minutes to 180 minutes.

BRIEF DESCRIPTION OF THE DRAWINGS

Other objects and advantages of the present invention will become apparent from the following description when taken in conjunction of the accompanying drawings, in which.

DETAILED DESCRIPTION OF THE INVENTION

In the following, methods of producing a piston of the present invention will be described in detail with reference to the accompanying drawings. The piston that will be described below refers to a piston designed for use in an internal combustion engine of a motor vehicle.

Figure 1:
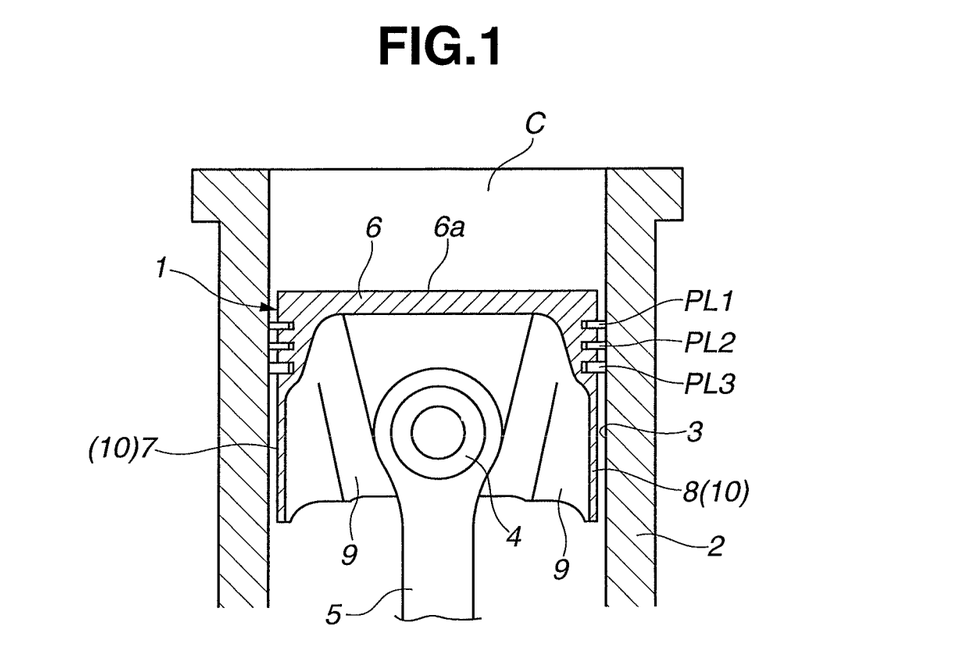
FIG. 1 is a vertically sectioned view of a skirt portion of a piston produced by a first embodiment of the present invention showing a condition in which the piston is operatively installed in an engine cylinder.

As shown in FIG. 1, the piston 1 produced through the method of the present invention is designed to be slidably received in a cylindrical wall 3 (viz., cylinder) formed in a cylinder block 2. A combustion chamber C is defined by the piston 1, the cylindrical wall 3 and a cylinder head (not shown) mounted on the cylindrical block 2.

The piston 1 is pivotally connected to an upper end of a connecting rod 5 through a piston pin 4, and a lower end of the connecting rod 5 is pivotally connected to a crankshaft (not shown).

Figure 2:
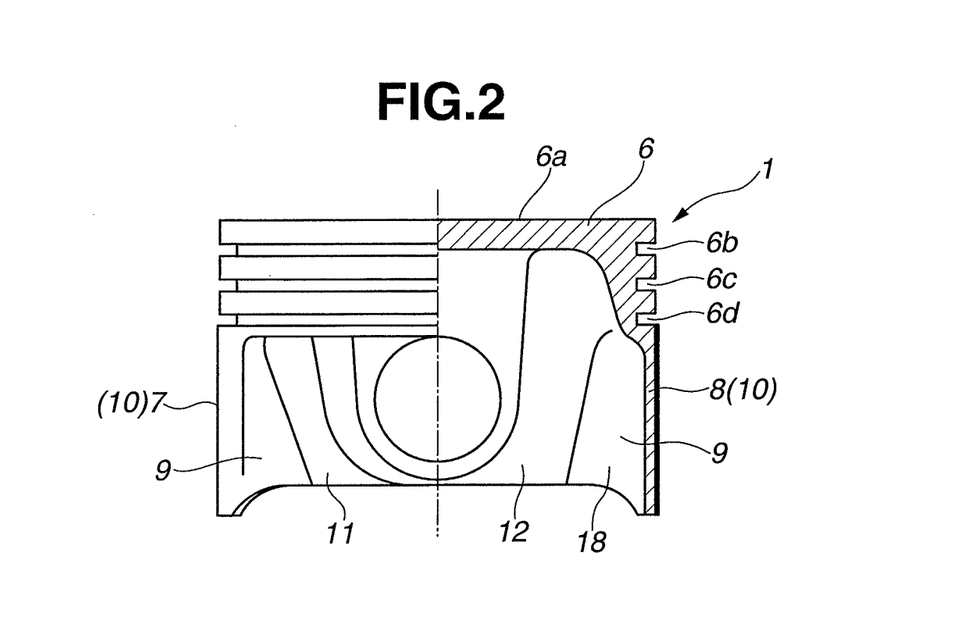
FIG. 2 is a partially sectioned front view of the piston produced by the first embodiment.

As is seen from FIGS. 1 and 2, the piston 1 has its cylindrical body formed in one piece by casting aluminum alloy, e.g., Al—Si alloy AC8A (JIS H 5202) and includes a crown portion 6 that has a top surface 6a exposed to the combustion chamber C, a pair of thrust-side and counterthrust-side skirt portions 7 and 8 that are integrally formed on an outer cylindrical lower part of the crown portion 6 and a pair of apron portions 9 and 9 that are integrally connected to circumferential ends of the skirt portions 7 and 8.

It is to be noted that the paired thrust-side and counterthrust-side skirt portions 7 and 8 are united to constitute a cylindrical main portion of the piston 1.

The crown portion 6 has a substantially cylindrical shape with a relative thick wall. The top surface 6a of the crown portion 6 has a valve recess (not shown) for avoiding interference with intake and exhaust valves (not shown). The crown portion 6 is formed at its cylindrical outer surface with three ring grooves 6b, 6c and 6d for receiving therein three piston rings PL1, PL2 and PL3 such as pressure ring, oil ring etc.,).

The skirt portions 7 and 8 are arranged symmetrical with respect to an axis of the piston 1. Each skirt portion 7 or 8 has a substantially arc-shaped cross section with a relatively small thickness throughout an entirety thereof.

The thrust-side skirt portion 7 is adapted to, when the piston 1 moves downward toward the bottom dead center (BDC) during expansion stroke, incline toward and come into contact under pressure with the cylinder wall 3 due to an angular positional relation between the piston 1 and the connecting rod 6.

While, the counterthrust-side skirt portion 8 is adapted to, when the piston 1 moves upward toward the top dead center (TDC) during compression stroke, incline toward and come into contact under pressure with a counterthrust side of the cylinder wall 3.

As the thrust-side skirt portion 7 is in sliding contact with the cylinder wall 3 under the influence of a combustion pressure, the contact pressure load of the thrust-side skirt portion 7 is larger than that of the counterthrust-side skirt portion 8.

Figure 3:
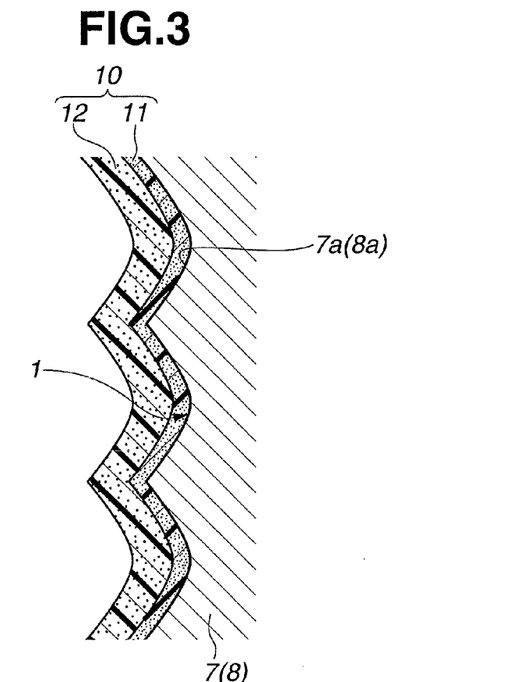
FIG. 3 is a schematically illustrated enlarged sectioned view of the skirt portion of the piston produced by the first embodiment.

As is seen from FIG. 3, each of the thrust-side and counterthrust-side skirt portions 7 and 8 has on its outer surface streaks 7a or 8a, and the streaked outer surface is applied or coated with a double layer solid lubricant film 10. The double layer solid lubricant film 10 includes a first solid lubricant film (or inner coating layer) 11 produced from a first film composition and a second solid lubricant film (or outer coating layer) 12 produced from a second film composition. As a binder for binding the two films 11 and 12, there is employed at least one of an epoxy resin, a polyimide resin and a polyamide-imide resin, which exhibit high heat resistance, high wear resistance and good adhesion to the piston base material.

More specifically, the first solid lubricant film 11 (viz., first film composition) is so set that one of the epoxy resin, polyimide resin and polyamide-imide resin, as a binder, is 50 wt % or more and at the same time at least one or more of polytetrafluoroethylene (PTFE) as a solid lubricant, molybdenum disulfide ($MoS_2$) and graphite (GF) is less than 50 wt %.

If, as is described in the above-mentioned Japanese Laid-open Patent Application (tokkai) 2010-216362, the binder is less than 50 wt %, the adhesion of the first solid lubricant film 11 to the base material of the piston 1 lowers. Accordingly, the binder is set to 50 wt % or more.

While, the second solid lubricant film 12 (viz., second film composition) is so set that at least one of the epoxy resin, polyimide resin and polyamide-imide resin, as a binder, is controlled to 5 to 50 wt %, and at the same time, molybdenum disulfide ($MoS_2$) as a solid lubricant is controlled to 50 to 95 wt %.

If, as is described in the above-mentioned Japanese Laid-open Patent Application (tokkai) 2010-216362, the binding resin is less than 5 wt %, the adhesion of the second solid lubricant film 12 to the first solid lubricant film 11 lowers due to reduction in binding force. While, if the binding resin exceeds 50 wt %, an initial adaptability of the second solid lubricant film 12 to the first solid lubricant film 11 lowers due to reduction in the amount of the solid lubricant.

The first and second film compositions having the above-mentioned component ratio are each diluted by an organic solvent and applied to the piston 1. That is, to the outer surfaces of the thrust-side and counterthrust-side skirt portions 7 and 8 of the piston 1, there are applied the first film composition and then the second film composition, and then these compositions are subjected to a firing to be cured. With these steps, the double layer solid lubricant film 10 is formed on the skirt portions 7 and 8 of the piston 1, as is seen from FIG. 3.

In order to prepare or adjust the first and second film compositions, the following steps may be employed.

That is, to the epoxy resin, polyimide resin and/or polyamide-imide resin as a binder, there is added an organic solvent to prepare a resin solution, and then, to the resin solution, there is added a solid lubricant and as the need arises there is added solid particles, and then, the solution is subjected to a mixing/dispersing treatment with the aid of a bead mill. In this case, the binding resin, the solid lubricant such as the above-mentioned polytetrafluoroethylene, molybdenum disulfide or graphite and the solid particles are so mixed to as to show 100 wt % in total.

In the following, a method of producing the piston 1 of the present invention will be described in detail with reference to FIGS. 4 to 8.

First, by using a common sand casting, a piston 1 in a green condition (which will be called "naked piston" hereinafter for ease of understanding) is produced. Then, as is indicated by step S1 of the process chart of FIG. 4, by employing a common machining, the outer surfaces of the thrust-side and counterthrust-side skirt portions 7 and 8 of the naked piston 1 are formed with streaks 7a and 8a.

Figure 4:
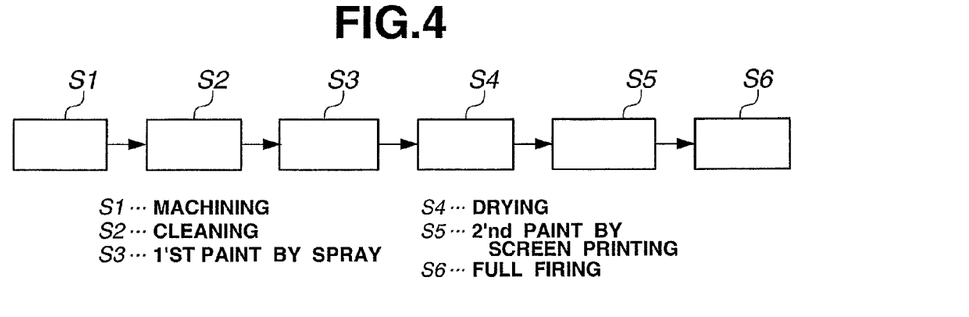
FIG. 4 is a process chart showing manufacturing steps of the piston according to the first embodiment.

Then, at step S2, the naked piston 1 is washed by steam to remove from the outer surfaces thereof lubricants used in the cutting process, and then, the naked piston 1 thus cleaned is dried.

Then, at step S3, the skirt potions 7 and 8 of the naked piston 1 thus cleaned and dried are applied with a first film forming paint 11a by using a paint spray gun. The first film forming paint 11a is produced by dissolving the above-mentioned first film composition in a certain amount of organic solvent.

Figure 5:
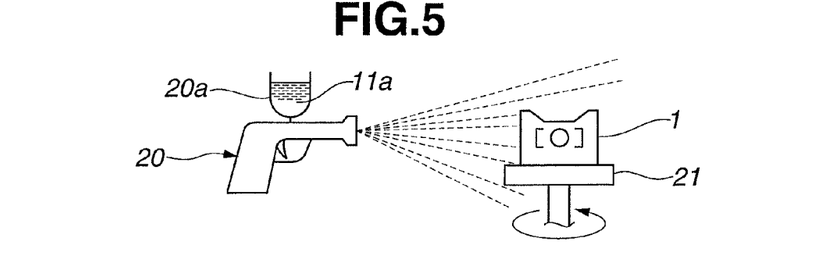
FIG. 5 is a schematic view showing a process of applying the piston with a first film forming composition (or paint)

More specifically, as is seen from FIG. 5, the naked piston 1 thus cleaned and dried is put on a turntable 21, and the first film forming paint 11a stored in a tank 20a of the paint spray gun 20 is sprayed to the naked piston 1 while turning the turntable 21. With this paint spraying, the first film forming paint 11a is uniformly applied or coated on the outer surfaces of the skirt portions 7 and 8 of the naked piston 1 where the streaks 7a and 8a are formed.

Then, at step S4 (see FIG. 4), the first film forming paint 11a thus applied to the naked piston 1 is dried.

It is now to be noted that in the present invention, drying the first film forming paint 11a is carried out at a temperature lower than a temperature that has been used in a conventional firing for a time shorter than a time that has been used in the conventional firing, so that upon completion of step S4, removal of the organic solvent from the first film forming paint 11a is not sufficiently made. In other words, the first film forming paint 11a is left damp-dried.

Figure 6:
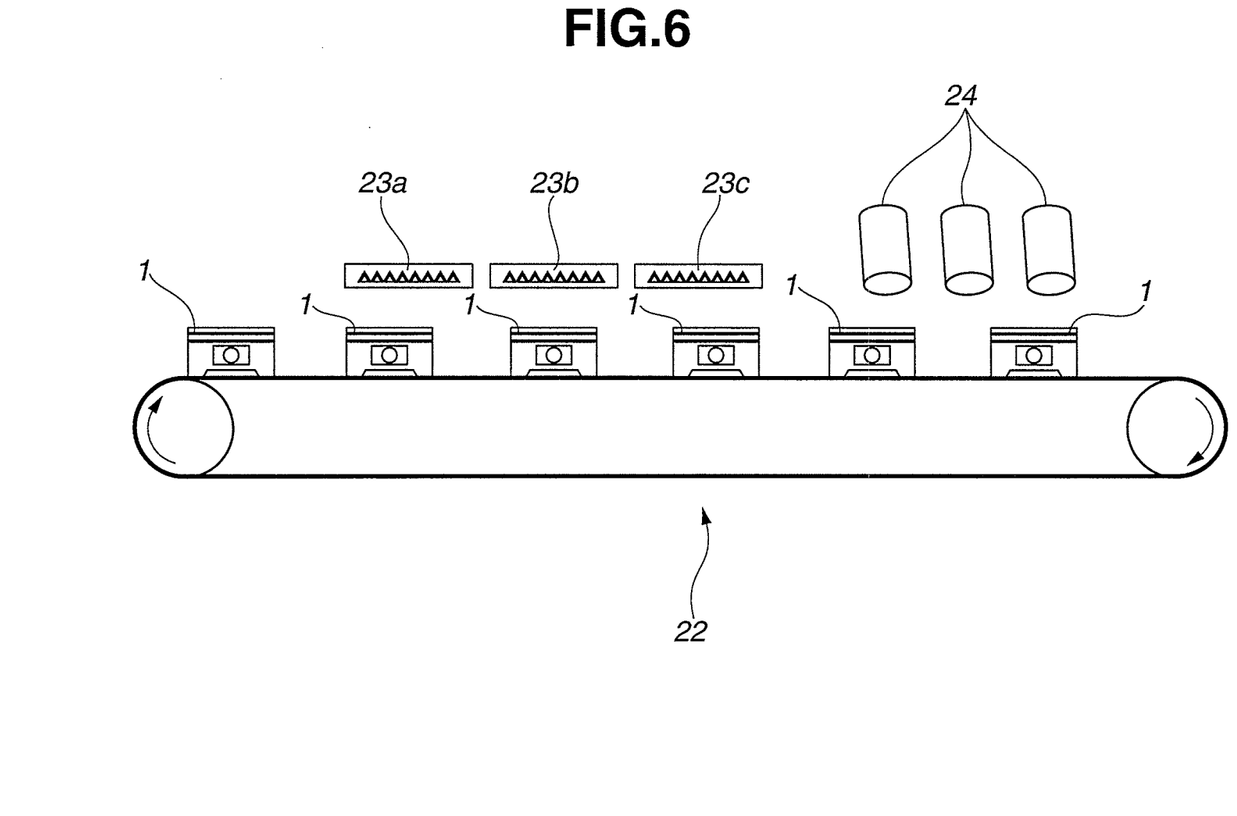
FIG. 6 is a schematic view showing a heating-cooling (or drying) process for the first film forming paint.

More specifically, as is seen from FIG. 6, the piston 1 having the first film forming paint 11a just applied thereto is put on a belt conveyer 22 and moved to a heating zone where three halogen lamps 23a, 23b and 23c (each having an output of 800 W) are arranged in series for heating the first film forming paint 11a for about 180 seconds. Then, due to work of the conveyer 22, the piston 1 having thereon the damped-dried paint 11a is moved to a cooling zone where cooled air blowers 24 are arranged in series for cooling the heated first film forming paint 11a. With this, the drying step S4 for insufficiently drying the first film forming paint 11a is finished.

Figure 7:
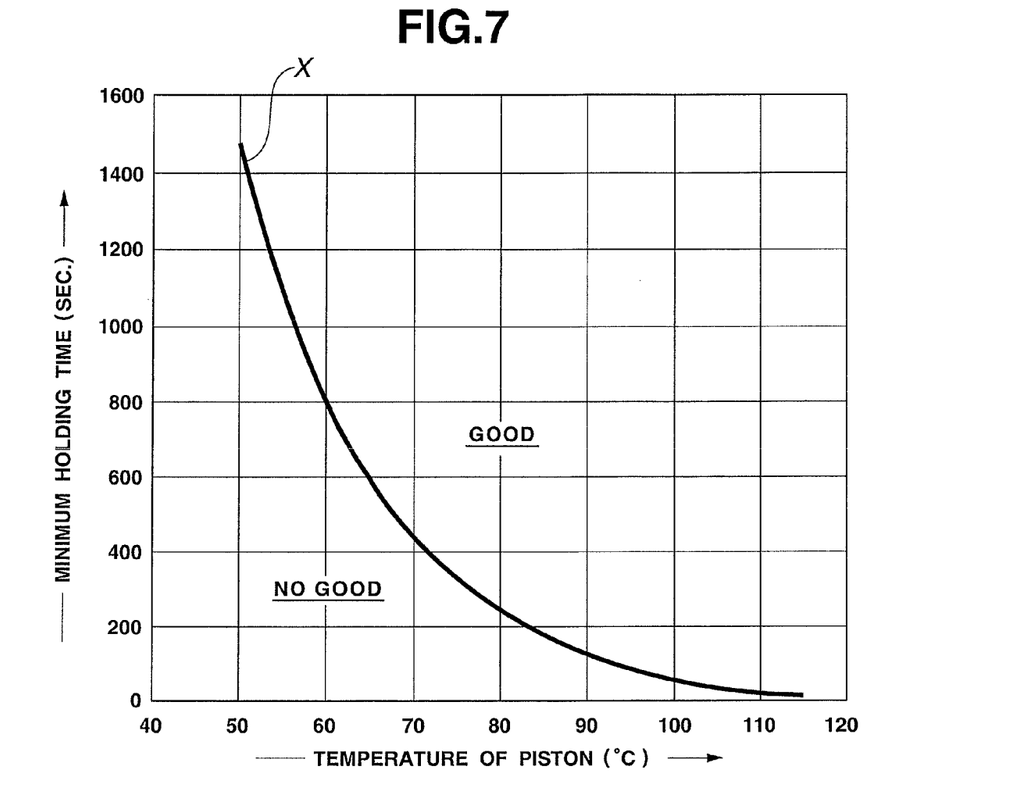
FIG. 7 is a graph showing a relationship between a thermal dose applied to the piston for drying the first film forming paint and a dryness state of the first film forming paint.

An appropriate damp-drying condition for the first film forming paint 11a can be looked up from the graph of FIG. 7 that shows a relationship between a temperature "T" of the piston 1 and a minimum holding time "t". It is to be noted that in the graph, a right zone of the curve "X" shows GOOD zone indicating a good damp-drying of the first film forming paint 11a while a left zone of the curve "X" shows NO GOOD zone indicating a no good damp-drying of the first film forming paint 11a.

As has been mentioned hereinabove, in the embodiment of the invention, drying the first film forming paint 11a is carried out at a temperature lower than a conventionally used temperature for a time shorter than a conventionally used time. That is, in the invention, drying (or firing) of the first film forming paint 11a is carried out at a temperature lower than a conventionally used minimum firing temperature (about 160° C.) for a time shorter than a conventionally used shortest firing time (about 800 seconds). Thus, in the embodiment of the invention, the drying (or firing) is so set that the drying temperature (viz., a first temperature) is controlled to a temperature between 60° C. and 160° C. and the drying (or firing) time is controlled to a time less than 800 seconds.

Then, referring back to FIG. 4, at step S5, by using a screen printing, a second film forming paint 12a is applied to an outer surface of the damp-dried first film forming paint 11a that has some organic solvent left therein. The second film forming paint 12a is produced by dissolving the above-mentioned second film composition in a certain amount of organic solvent.

Figure 8:
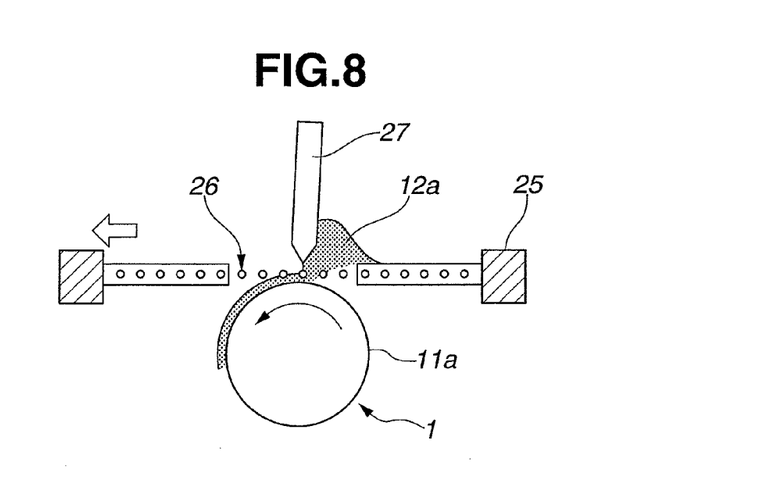
FIG. 8 is a schematic view showing a process of applying a piston with a second film forming composition (or paint) according to the first embodiment of the present invention.

More specifically, as is seen from FIG. 8, the second film forming paint 12a is put on a screen 26 stretched on a frame 25, and a squeegee 27 is moved on and across the screen 26 while squashing the second film forming paint 12a. With this, the second film forming paint 12a is printed on the damp-dried first film forming paint 11a through the screen 26.

Then, at step S6, the first and second film forming paints 11a and 12a on the outer surface of the cylindrical surface of the piston 1 are subjected to a so-called full firing.

It is now to be noted that in the embodiment of the present invention, the full firing means a firing that is carried out at a temperature higher than the temperature used at step S4 for drying the first film forming paint 11a, so that upon completion of step S6, removal of the organic solvent from the first and second film forming paints 11a and 12a is sufficiently and completely made thereby providing both the paints 11a and 12a with a sufficient hardening.

More specifically, for the full firing of the paints 11a and 12a, the piston 1 (viz., incompletely fired piston) having the first and second film forming paints 11a and 12a applied thereto in a double layer is put into a heating furnace (not shown) and heated at a temperature of 160° C. to 240° C. (viz., second temperature) for a time of 15 to 180 minutes. With this firing step, the first and second film forming paints 11a and 12a are fully cured and hardened while removing the organic solvent therefrom, and thus, the double layer solid lubricant film 10 is formed on cylindrical outer surface of the piston 1.

Figure 9:
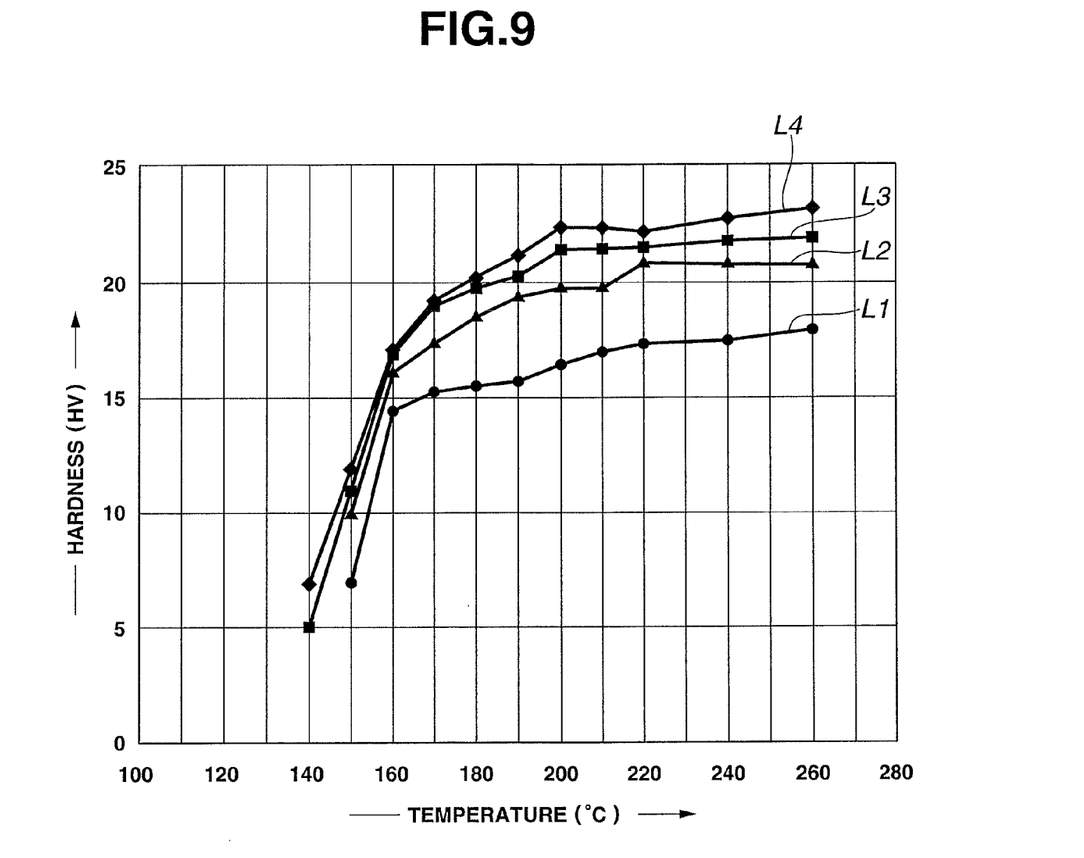
FIG. 9 is a graph showing test results on the relationship between a firing temperature, a firing time and a hardness possessed by a fired film on the piston.

The reason for heating the incompletely fired piston 1 at the temperature of 160° C. to 240° C. at step S6 is based on the results of a performance examination which are depicted by the graph of FIG. 9.

The graph of this drawing shows the hardness (Vickers hardness HV) of the two skirt portions 7 and 8 of the piston 1 when test pieces of the incompletely fired piston 1 were subjected to four types of firing tests L1, L2, L3 and L4. That is, these tests L1, L2, L3 and L4 were tests in which the corresponding test pieces were heated or fired at a temperature of 140° C. to 260° C. for 15, 30, 45 and 60 minutes, respectively.

In view of an empirical knowledge that indicates need of hardness HV of about 15 and more for the fired skirt portions 7 and 8 of the piston 1, it became apparent from the graph of FIG. 9 that the firing temperature should be set at 160° C. or higher for sufficiently firing the skit portions 7 and 8. While, if the firing temperature was set higher than 240° C., aluminum alloy of the material of the piston 1 became softened. Thus, it has become apparent that an appropriate range of the firing temperature is 160 to 240° C.

In view of an empirical knowledge that indicates need of hardness HV of about 15 and more for the fired skirt portions 7 and 8, it became also apparent from the graph of FIG. 9 that the firing time should be set to 15 minutes or more for sufficiently firing the skirt portions 7 and 8. In the above-mentioned performance examination, no test was carried out in which the test piece was fired for a time shorter than 15 minutes, and thus the graph of FIG. 9 does not prepare a corresponding curve therein. However, from the results of the performance examination actually carried out, it may be easily guessed that in case of a time shorter than 15 minutes, the hardness HV possessed by the skirt portions 7 and 8 in case of the lower limit (160° C.) of the firing temperature is lower than 15. Thus, in the invention, the lower limit of the firming time is set to 15 minutes.

The graph of FIG. 9 shows that with increase of the tiring time, the hardness HV of the skirt portions 7 and 8 increases. However, when the firing time exceeds 180 minutes, there is a possibility of deformation of aluminum alloy of the piston 1. Accordingly, in the invention, the firing time is set to 15 to 180 minutes.

As is mentioned hereinabove, in the embodiment of the present invention, just after application of the first film forming paint 11a on the naked piston 1, drying is made to the paint 11a at a relatively low temperature for a relatively short time. Due to this soft drying employed, it becomes possible to reduce the time for heating (or firing) the first film forming paint 11a as well as the time for cooling the heated paint 11a for preparation of the application of the second film forming paint 12a.

Accordingly, in the embodiment of the present invention, the double layer solid lubricant film 10 applied to the outer surface of the piston 1 can be easily and sufficiently fired in a shorter time, which brings about improvement in productivity of the finished piston 1 and thus reduction in production cost.

Furthermore, in the embodiment, in addition to the above-mentioned reduction in firing time, usage of a lower temperature for drying the first film forming paint 11a brings about a considerable saving of energy and thus effective reduction in the production cost.

Furthermore, in the embodiment, the amount of the solid lubricant for the first solid lubricant film 11 is set to be less than 50 wt %. Thus, the adhesion of the first solid lubricant film 11 to the base material of the piston 1 is increased. Furthermore, in the embodiment, the amount of the solid lubricant for the second solid lubricant film 12 is set to be 50 to 95 wt %. Thus, in operation of the piston 1 in an associated cylinder 3 of the engine, the originally rough outer surface of the second solid lubricant film 12 can be worn in a relatively short time thereby to produce a smoothed outer surface of the film 12. Thus, an initial adaptability of the second solid lubricant film 12, viz., of the skirt portions 7 and 8 of the piston 1 to the cylinder wall 3 is smoothly and quickly obtained.

In the following, a second embodiment of the present invention will be described with reference to FIG. 10.

The second embodiment is substantially the same as the above-mentioned first embodiment except the drying process of the first film forming paint 11a.

That is, in this second embodiment, after the first film forming paint 11a is applied or coated to the outer surfaces of the skirt portions 7 and 8 of the piston 1 by using the turntable 21 (see FIG. 5), the first film forming paint 11a thus applied to the piston is dried in the following manner.

Figure 10:
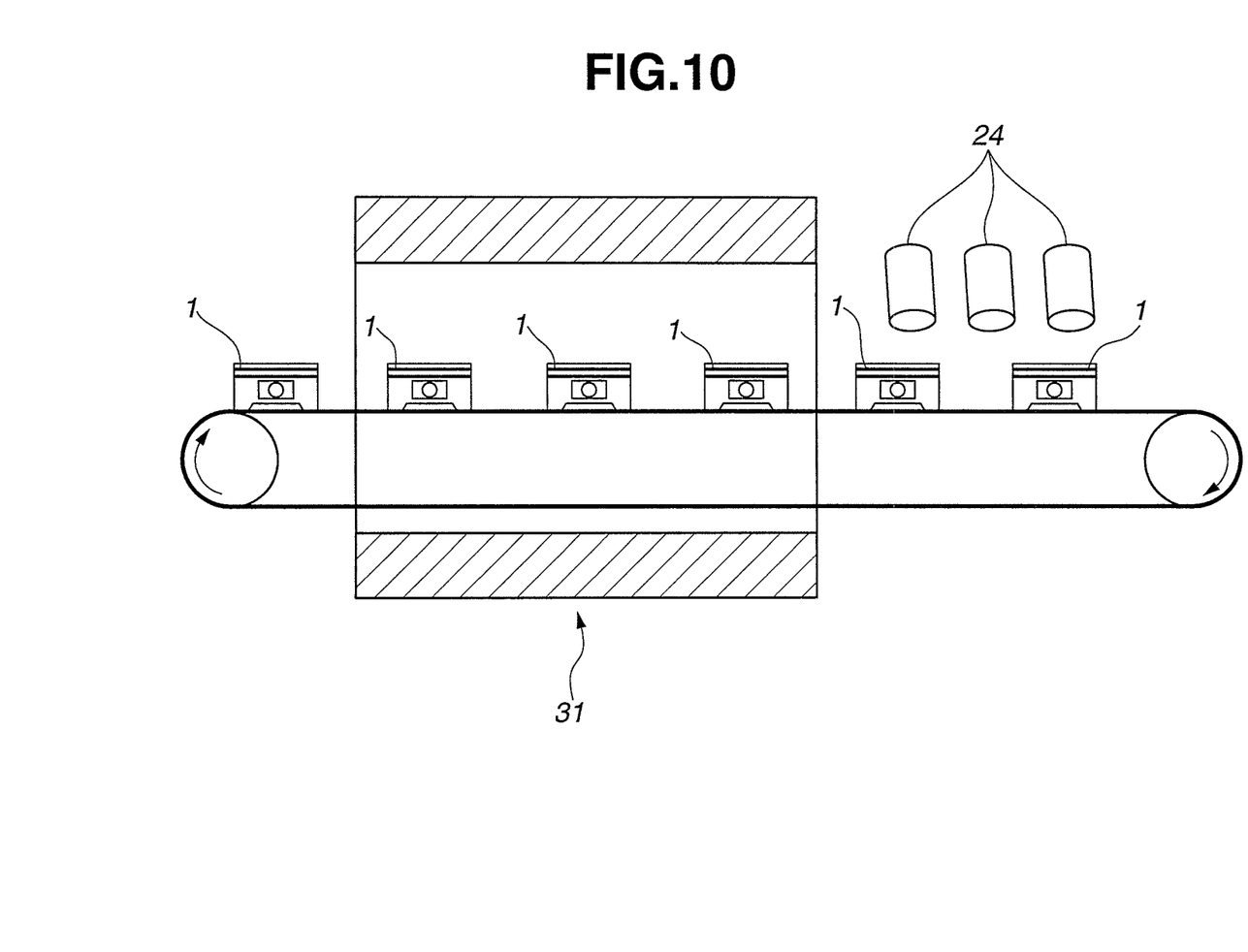
FIG. 10 is a schematic view showing a heating-cooling (or drying) process employed in a second embodiment of the present invention.

That is, as is seen from FIG. 10, the piston 1 having the first film forming paint 11a just applied thereto is put on a belt conveyer 22 and moved to a heating zone where a drying oven 31 is arranged to heat the first film forming paint 11a of each piston 1 at about 190° C. for about 84 seconds. More specifically, the drying oven 31 is set to show the temperature of 190° C. Then, due to work of the belt conveyer 22, the piston 1 is moved to a cooling zone where cooled air blowers 24 are arranged in series for cooling the heated first film forming paint 11a. With this, the drying step for insufficiently drying the first film forming paint 11a in the second embodiment is finished.

It has been revealed that the dried condition of the paint 11a in this second embodiment is higher than that of the above-mentioned first embodiment.

Figure 11:
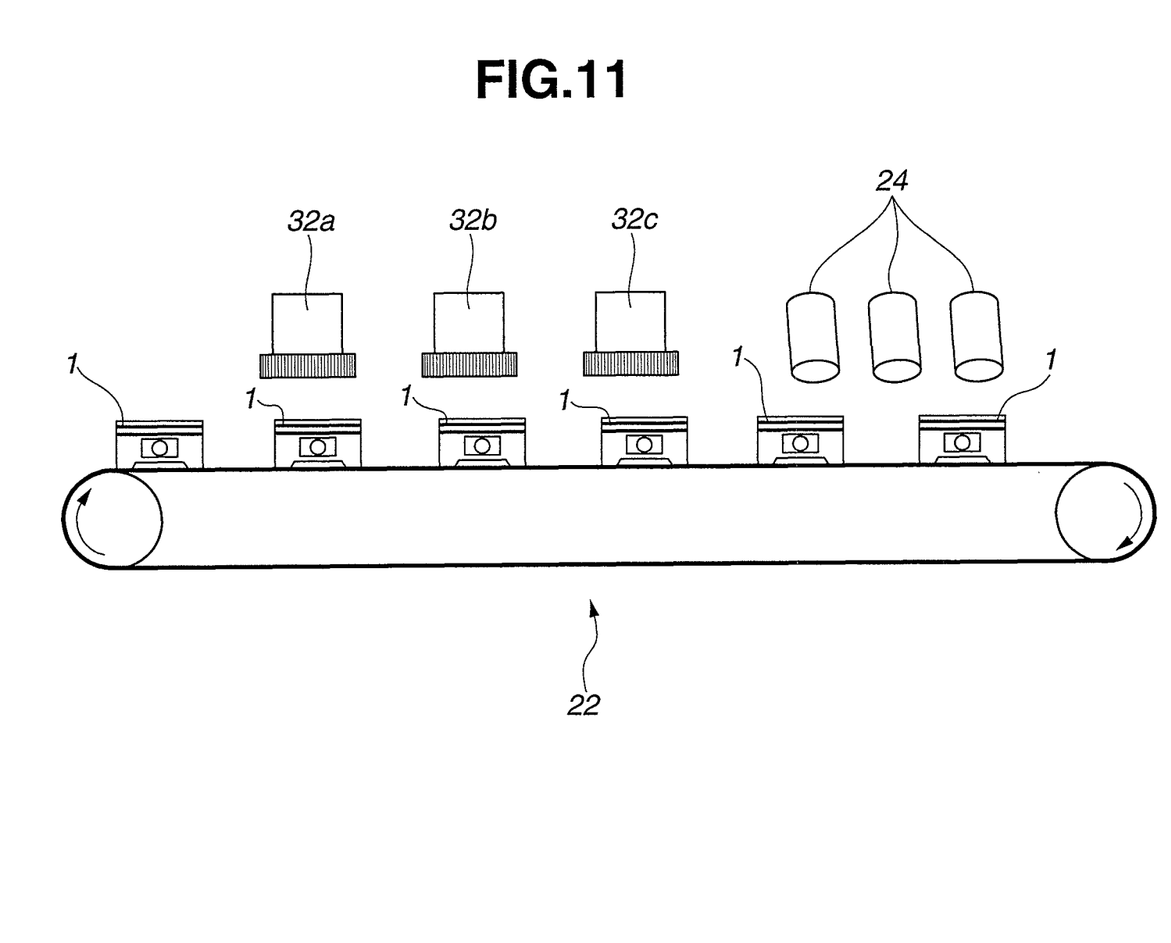
FIG. 11 is a view similar to FIG. 10, but showing a drying process employed in a third embodiment of the present invention.

In the following, a third embodiment of the present invention will be described with reference to FIG. 11.

That is, in this third embodiment, after the first film forming paint 11a is just applied or coated to the piston 1 by using the turntable 21 (see FIG. 5), the piston 1 is put on a belt conveyer 22 and moved to a heating zone where three heated air blowers 32a, 32b and 32c (each having an output of 10 kW) are arranged in series for heating the first film forming paint 11a for about 42 seconds. Then, due to work of the belt conveyer 22, the piston 1 is moved to a cooling zone where cooled air blowers 24 are arranged in series for cooling the heated first film forming paint 11a. With this, the drying step for insufficiently drying the first film forming paint 11a in the third embodiment is finished.

It has been revealed that the dried condition of the paint 11a in this third embodiment is higher than that of the above-mentioned first embodiment.

Figure 12:
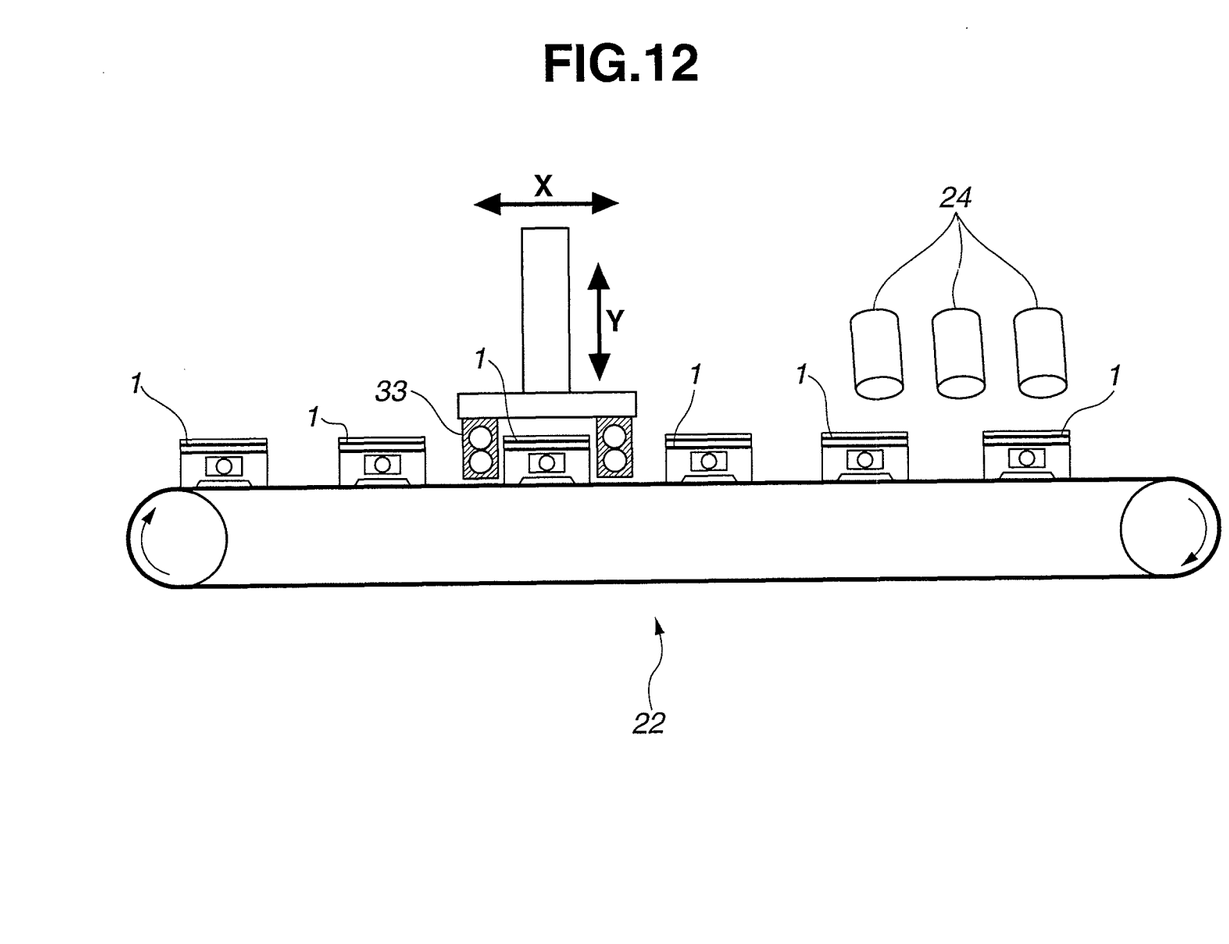
FIG. 12 is a view similar to FIG. 10, but showing a drying process employed in a fourth embodiment of the present invention.

In the following, a fourth embodiment of the present invention will be described with reference to FIG. 12.

That is, in this fourth embodiment, after the first film forming paint 11a is just applied or coated to the piston 1 by using the turntable 21 (see FIG. 5), the piston 1 is put on a belt conveyer 22 and moved to a heating spot where a high frequency heating coil 33 (type: 3.5 kW×0.9 A) is arranged for heating the first film forming paint 11a for about 25 seconds. As is seen from the drawing, the heating coil 33 is movable in both "X" and "Y" directions for subjecting each piston 1 to the above-mentioned heating condition. That is, when each piston 1 is moved to a given position, the heating coil 33 is moved down in the direction of "Y" to cover the piston 1 and moved together with the piston 1 for 25 seconds in the direction of "X". During the movement in the direction of "X", the heating coil 33 is energized for heating the paint 11a. Upon completion of the time of 25 seconds, the heating coil 33 is moved up and moved forward to its stand-by position for heating a next piston 1. Then, due to work of the belt conveyer 22, the piston 1 is moved to a cooling zone where cooled air blowers 24 are arranged in series for cooling the heated first film forming paint 11a. With this, the drying step for insufficiently drying the first film forming paint 11a in the fourth embodiment is finished.

It has been revealed that the dried condition of the paint 11a in this fourth embodiment is higher than that of the above-mentioned first embodiment.

Figure 13:
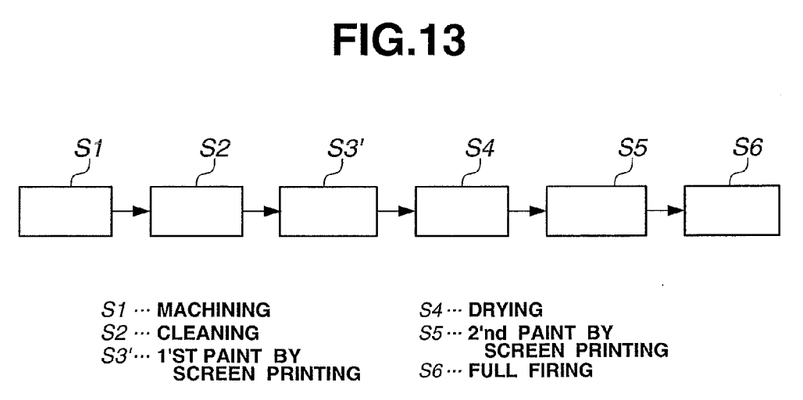
FIG. 13 is a process chart showing manufacturing steps of the piston according to a fifth embodiment of the present invention.

Referring to FIG. 13, there is shown a process chart that shows manufacturing steps of a piston of a fifth embodiment of the present invention.

The fifth embodiment is substantially the same as the above-mentioned first embodiment except for the step S3.

That is, in step S3' of this fifth embodiment, the skirt portions 7 and 8 of the piston 1 thus cleaned and dried are applied with a first film forming paint 11a by using a screen printing. That is, like in the case of the second film forming paint 12a of the first embodiment, the first film forming paint 12a is put on a certain screen and a squeegee is moved on and across the screen while squashing the first film forming paint 11a. With this, the first film forming paint 11a is printed on the skirt portions 7 and 8 of the naked piston 1.

Thereafter, substantially same steps S4, S5 and S6 as those of the above-mentioned first embodiment are applied to the piston 1.

In this fifth embodiment, due to usage of the screen printing, the yield of the finished pistons is increased. More specifically, in case of employing the screen printing, there is no waist paint that would be inevitably scattered outside without being applied to the piston in case of a paint spraying.

The entire contents of Japanese Patent Application 2012-30032 filed Feb. 15, 2012 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A method of producing a piston of an internal combustion engine, the piston having a skirt portion on which inner and outer solid lubricant films are formed as a double layer solid lubricant film, the outer solid lubricant film having a wear resistance lower than that of the inner solid lubricant film, the method comprising:
producing a naked piston having the skirt portion;
forming the skirt portion with streaks;
applying the skirt portion of the naked piston with a first film forming paint which is provided for producing the inner solid lubricant film;
heating the first film forming paint on the skirt portion at a temperature of 60° C. to 160° C. for a time less than 800 seconds to dry the same;
applying an outer surface of the dried first film forming paint with a second film forming paint which is provided for producing the outer solid lubricant film; and
heating the first and second film forming paints on the skirt portion at a temperature of 160° C. to 240° C. for a time of 15 minutes to 180 minutes.

2. A method of producing a piston as claimed in claim 1, in which the first film forming paint is applied to the skirt portion of the naked piston after the produced piston is cleaned.

3. A method of producing a piston as claimed in claim 1, in which the first and second film forming paints are applied to the target surfaces through a screen printing.

4. A method of producing a piston as claimed in claim 1, in which the first film forming paint is applied to the target surface through a spraying and the second film forming paint is applied to the target surface through a screen printing.

5. A method of producing a piston as claimed in claim 1, in which each of the first and second film forming paints includes at least one of an epoxy resin, a polyimide resin and a polyamide-imide resin as a binder and a solid lubricant which is either one of graphite and molybdenum disulfide.

6. A method of producing a piston as claimed in claim 5, in which a composition of the first film forming paint is so set as to cause the solid lubricant to show 50 wt % or less as a content rate and a composition of the second film forming paint is so set as to cause the solid lubricant to show 50 wt % to 95 wt % as a content rate.

7. A piston of an internal combustion engine manufactured by the process of claim 1.

8. A method of producing a piston of an internal combustion engine, the piston having a double layer solid lubricant film formed on a skirt portion thereof, the method comprising:
producing a naked piston having the skirt portion;
applying an outer surface of the skirt portion with a first film forming paint which is provided for producing an inner solid lubricant film;
heating the first film forming paint at a first temperature to cause the first film forming paint to be damp-dried with some organic solvent left therein;
applying an outer surface of the damp-dried first film forming paint with a second film forming paint which is provided for producing an outer solid lubricant film; and
firing the first and second film forming paints at a second temperature that is higher than the first temperature.

9. A piston of an internal combustion engine manufactured by the process of claim 8.

* * * * *